(12) United States Patent
Fujiwara et al.

(10) Patent No.: US 10,176,902 B2
(45) Date of Patent: Jan. 8, 2019

(54) SCINTILLATOR PANEL

(71) Applicant: TORAY INDUSTRIES, INC., Tokyo (JP)

(72) Inventors: Hideyuki Fujiwara, Otsu (JP); Tetsuo Uchida, Otsu (JP); Hideki Kinoshita, Otsu (JP); Akira Akimoto, Otsu (JP)

(73) Assignee: Toray Industries, Inc., Tokyo (JP)

( * ) Notice: Subject to any disclaimer, the term of this patent is extended or adjusted under 35 U.S.C. 154(b) by 206 days.

(21) Appl. No.: 15/037,805

(22) PCT Filed: Nov. 11, 2014

(86) PCT No.: PCT/JP2014/079820
§ 371 (c)(1),
(2) Date: May 19, 2016

(87) PCT Pub. No.: WO2015/076150
PCT Pub. Date: May 28, 2015

(65) Prior Publication Data
US 2016/0293285 A1    Oct. 6, 2016

(30) Foreign Application Priority Data

Nov. 20, 2013   (JP) .................. 2013-239544

(51) Int. Cl.
*G01T 1/20* (2006.01)
*G21K 4/00* (2006.01)
*G01T 1/164* (2006.01)

(52) U.S. Cl.
CPC ............. *G21K 4/00* (2013.01); *G01T 1/1644* (2013.01); *G01T 1/20* (2013.01); *G01T 1/2002* (2013.01); *G21K 2004/06* (2013.01)

(58) Field of Classification Search
CPC .......................................... G21K 4/00
See application file for complete search history.

(56) References Cited

U.S. PATENT DOCUMENTS 4,982,096 A    1/1991   Fujii et al.
7,211,942 B1   5/2007   Ogawa
(Continued)

FOREIGN PATENT DOCUMENTS

CN    1643399        7/2005
JP    H01191085 A    8/1989
(Continued)

OTHER PUBLICATIONS

International Search Report and Written Opinion of the International Searching Authority for International Application No. PCT/JP2014/079820 dated Feb. 3, 2015.
(Continued)

*Primary Examiner* — David P Porta
*Assistant Examiner* — Jeremy S Valentiner
(74) *Attorney, Agent, or Firm* — RatnerPrestia

(57) ABSTRACT

The present invention is a scintillator panel including: a substrate, a barrier rib formed on the substrate, and a scintillator layer containing a phosphor filling cells divided by the barrier rib, wherein the scintillator layer is formed of a plurality of layers having different phosphor concentrations. The present invention provides a scintillator panel in which formation of the barrier rib makes it possible to improve image clarity and obtain a sufficient amount of emitted light.

7 Claims, 2 Drawing Sheets

(56) References Cited

U.S. PATENT DOCUMENTS

| | | | | |
|---|---|---|---|---|
| 8,084,742 B1* | 12/2011 | Nagarkar | ............. | G01T 1/2008 250/363.03 |
| 2004/0178347 A1* | 9/2004 | Murayama | ............ | G01T 1/1644 250/367 |
| 2005/0087693 A1* | 4/2005 | Sumiya | ................. | G01T 1/2018 250/367 |
| 2006/0033030 A1 | 2/2006 | Ito | | |
| 2006/0054863 A1* | 3/2006 | Dai | ........................ | B82Y 10/00 252/301.4 R |
| 2006/0202128 A1 | 9/2006 | Berger | | |
| 2007/0138409 A1* | 6/2007 | Daniel | ..................... | G01T 1/20 250/483.1 |
| 2007/0285012 A1* | 12/2007 | Bae | ......................... | H01J 9/242 313/582 |
| 2008/0164416 A1* | 7/2008 | Safai | ....................... | G01T 1/202 250/366 |
| 2014/0091235 A1* | 4/2014 | Iguchi | ....................... | G01T 1/20 250/487.1 |

FOREIGN PATENT DOCUMENTS

| | | | | |
|---|---|---|---|---|
| JP | | 0560871 | 3/1993 | |
| JP | | 05188148 | 7/1993 | |
| JP | | 2004239722 | 8/2004 | |
| JP | | 2004340737 | 12/2004 | |
| JP | | 2006242949 | 9/2006 | |
| JP | | 2011007552 | 1/2011 | |
| JP | | 2011257339 | 12/2011 | |
| JP | WO 2012161304 A1 * | 11/2012 | ............... | G01T 1/20 |
| JP | | 5110230 B1 | 12/2012 | |
| JP | | 2014029314 | 2/2014 | |
| WO | | 2012161304 A1 | 7/2014 | |

OTHER PUBLICATIONS

Supplementary European Search Report for Application No. EP 14 86 3327, dated Jun. 1, 2017, 7 pages.

* cited by examiner

SCINTILLATOR PANEL

CROSS REFERENCE TO RELATED APPLICATIONS

This is the U.S. National Phase application of PCT International Application No. PCT/JP2014/079820, filed Nov. 11, 2014, and claims priority to Japanese Patent Application No. 2013-239544, filed Nov. 20, 2013, the disclosures of each of these applications being incorporated herein by reference in their entireties for all purposes.

FIELD OF THE INVENTION

The present invention relates to a scintillator panel.

BACKGROUND OF THE INVENTION

X-ray images using films have been widely used heretofore in medical settings. However, the X-ray image using a film provides analog image information, and in recent years, digital radiation detectors such as computed radiography (CR) and flat panel radiation detectors (flat panel detectors: FPDs) have been developed.

The FPDs include a direct system and an indirect system. In the indirect system, a scintillator panel is used for converting a radiation into visible light. The scintillator panel includes, as a constituent element, a scintillator layer containing a phosphor such as cesium iodide, the phosphor emits visible light in response to an applied X-ray, and the emitted light is converted into an electric signal by a TFT or a CCD to thereby convert X-ray information into digital image information.

As the scintillator layer, a columnar crystal formed by vapor-depositing a phosphor is known; however, this type has a problem of productivity. On the other hand, a method in which a coating film of a paste-like phosphor powder is formed to be used as a scintillator layer causes problems that scattering of the emitted light within the coating film increases and image clarity is deteriorated although the method is simple.

In order to suppress a problem of the scattering of the emitted light, in recent years, methods in which a barrier rib for dividing the scintillator layer is formed in advance are proposed (Patent Documents 1 to 3).

PATENT DOCUMENTS

Patent Document 1: Japanese Patent Laid-open Publication No. 5-60871
Patent Document 2: Japanese Patent Laid-open Publication No. 5-188148
Patent Document 3: Japanese Patent Laid-open Publication No. 2011-007552

SUMMARY OF THE INVENTION

However, since the barrier rib does not emit light by irradiation of X-rays, a new problem that an amount of emitted light of the entire scintillator panel is reduced with an increase of a barrier rib volume arises. In order to solve this problem, it is conceivable to increase a thickness of the scintillator layer, but it has been the case that since scattering of the emitted light within the scintillator layer increases, an amount of emitted light cannot be increased effectively.

Thus, it is an object of the present invention to provide a scintillator panel capable of improving image clarity and obtaining a sufficient amount of emitted light.

This problem is solved by a scintillator panel including a substrate, a barrier rib formed on the substrate, and a scintillator layer containing a phosphor filling cells divided by the barrier rib, wherein the scintillator layer is formed of a plurality of layers having different phosphor concentrations.

In accordance with the scintillator panel of the present invention, it becomes possible to obtain a sufficient amount of emitted light by effectively suppressing scattering of emitted light or the like within the scintillator layer while improving image clarity by the formation of the barrier rib.

DETAILED DESCRIPTION OF EMBODIMENTS OF THE INVENTION

The preferred configurations of a scintillator panel of the present invention will be described below with reference to the drawings, but the present invention is not limited thereto.

Figure 1:
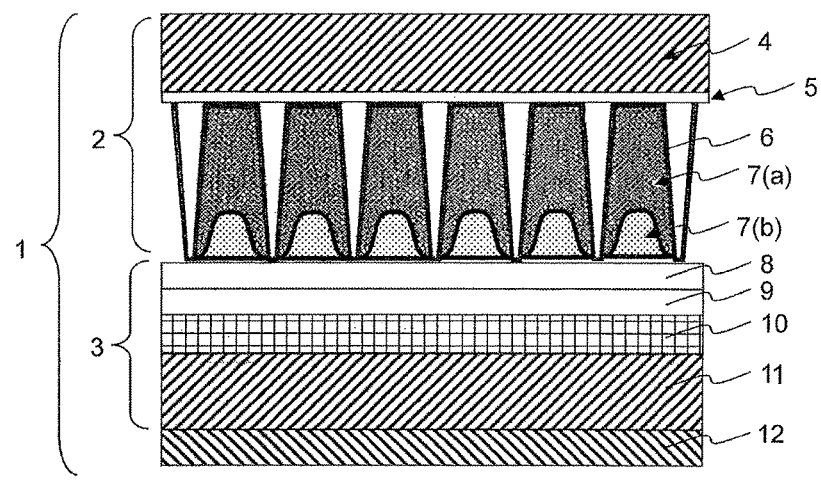
FIG. 1 is a sectional view schematically showing the configuration of a radiation detector including an embodiment of a scintillator panel of the present invention.

FIG. 1 is a sectional view schematically showing the configuration of a radiation detector including a scintillator panel of an embodiment of the present invention. A radiation detector 1 includes a scintillator panel 2, an output substrate 3 and a power supply portion 12.

Figure 2:
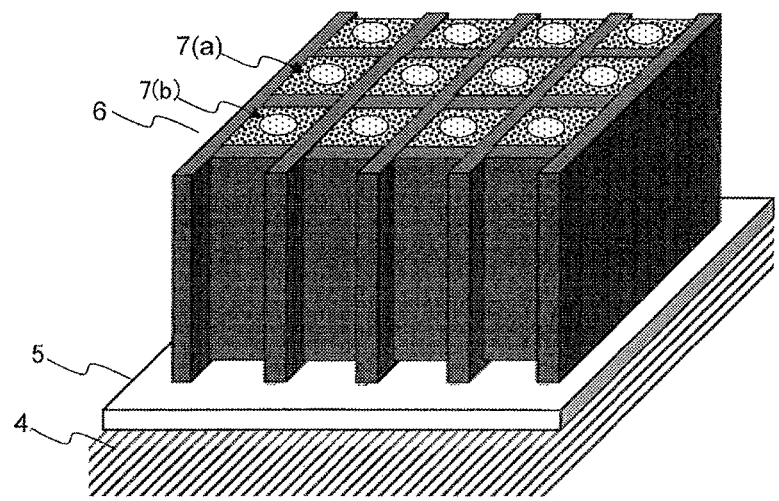
FIG. 2 is a perspective view schematically showing the configuration of the scintillator panel of an embodiment of the present invention.
Figure 3:
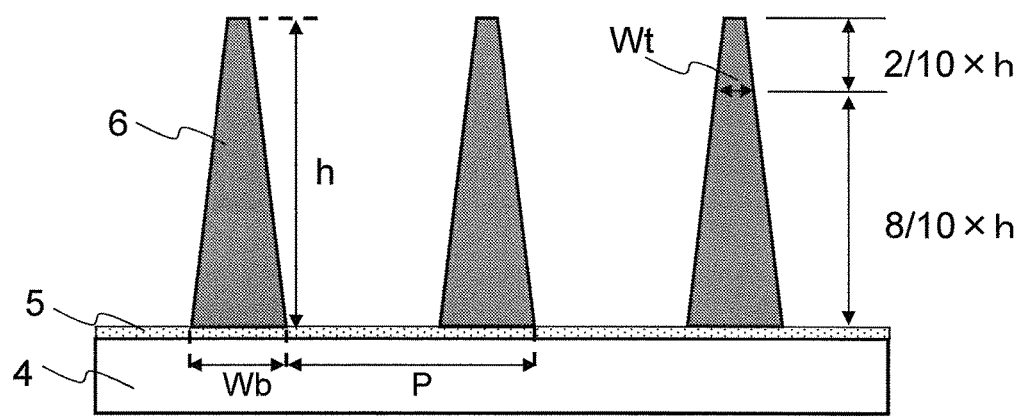
FIG. 3 is a view schematically showing a cross-section of a barrier rib constituting the scintillator panel of an embodiment of the present invention.

FIG. 2 is a perspective view schematically showing the configuration of the scintillator panel of an embodiment of the present invention. Further, FIG. 3 is a view schematically showing a cross-section of a barrier rib constituting the scintillator panel. Hereinafter, the cross-section of a barrier rib refers to, as shown in FIG. 3, a cross-section at the time when a barrier rib is cut in its height direction and in a direction perpendicular to its longitudinal direction.

The scintillator panel 2 includes a substrate 4, a barrier rib 6 formed on the substrate 4, and a scintillator layer (7(*a*) and 7(*b*)) filling a cell divided by the barrier rib 6.

Herein, the scintillator layer refers to a layer containing a phosphor filling cells divided by a barrier rib. The scintillator layer constituting the scintillator panel of an embodiment of the present invention is formed of a plurality of layers having different phosphor concentrations. The scintillator layer may be three or more-layered. The scintillator layer may include a layer not containing a phosphor at all, that is, a layer in which the concentration of the phosphor is 0%.

A buffer layer 5 is preferably formed between the substrate 4 and the barrier rib 6. By forming the buffer layer 5, the barrier rib 6 can be stably formed. By increasing the reflectivity of the buffer layer 5 to visible light, light emitted of a phosphor contained in the scintillator layer can be made to reach a photoelectric conversion layer 9 on the output substrate 3 with high efficiency.

The output substrate 3 has the photoelectric conversion layer 9 and an output layer 10 on a substrate 11. The photoelectric conversion layer 9 is one in which pixels composed of photosensors and TFT are two-dimensionally formed. The light exit surface of the scintillator panel 2 and the photoelectric conversion layer 9 of the output substrate 3 are bonded or adhered to each other with a diaphragm layer 8 made of a polyimide resin or the like interposed therebetween, and thereby, the radiation detector 1 is formed. A phosphor of the scintillator panel 2 emits visible light in response to a radiation applied from an external radiation source, the light emitted reaches the photoelectric conversion layer 9, undergoes photoelectric conversion at the photoelectric conversion layer 9, and image data is output through the output layer 10. The scintillator layer fills cells divided by a barrier rib, and therefore when a photoelectric conversion element in the photoelectric conversion layer 9 is arranged so as to correspond to the size and pitch of pixels of a photoelectric conversion element arranged in a grid-like shape and the size and pitch of cells of the scintillator panel, scattering of emitted light can be prevented from affecting a neighboring cell. Thereby, blurring of images resulting from scattering of emitted light can be reduced, so that high-definition image is realized.

The scintillator layer is formed of a plurality of layers having different phosphor concentrations. Irradiation of X-rays for light emission of the phosphor may be performed from either of a substrate side and a side opposite to the substrate side, and when the irradiation of X-rays is performed from the substrate side, it is preferred that the concentration of a phosphor in a layer closest to the substrate is the highest. In this case, the concentration of a phosphor in a layer closest to the substrate is preferably 50% or more, and more preferably 70% or more in order to attain a sufficient amount of emitted light.

Of the plurality of layers contained in the scintillator layer, a layer in which the concentration of the phosphor is the highest is referred to as a high concentration layer. A thickness of the high concentration layer may be appropriately adjusted according to a kind and a shape of the phosphor, and it is preferably 120 to 500 µm, more preferably 150 to 500 µm, and moreover preferably 180 to 400 µm. When the thickness of the high concentration layer is less than 120 µm, the amount of emitted light is reduced. On the other hand, when the thickness of the high concentration layer is more than 500 µm, the emitted light may be absorbed or may be scattered in the high concentration layer. Herein, the thickness of the high concentration layer refers to a width of the high concentration layer in a direction perpendicular to a surface of the substrate, with a starting point for the width being a point in which the high concentration layer is closest to the substrate, in the cross-section of the scintillator layer. A thickness of layers constituting the scintillator layer other than the high concentration layer can also be measured under the same concept as in the thickness of the high concentration layer. In addition, the cross-section of the scintillator layer refers to a cross-section of the scintillator layer which is observed, as shown in FIG. 1, at the time when the barrier rib of the scintillator panel is cut in its height direction and in a direction perpendicular to its longitudinal direction.

The concentration of a phosphor in layers constituting the scintillator layer can be measured by precisely polishing a cross section of a scintillator layer, and then observing the cross section with an electron microscope. More specifically, a part of the phosphor and another part (including pores) are converted into images in a two-gray scale, and defining a ratio of the area of the phosphor part to the area of the cross section of a scintillator layer as the concentration of a phosphor.

At least one of the plurality of layers forming the scintillator layer is preferably a light-transmitting layer. Herein, the light-transmitting layer refers to a layer in which a visible light transmittance as a total light transmittance of light with a wavelength of 550 nm is 15% or more. The visible light transmittance of the light-transmitting layer is preferably 30% or more, and more preferably 50% or more.

The visible light transmittance of the light-transmitting layer can be determined by applying a value corresponding to the thickness of the light-transmitting layer to a calibration curve prepared in advance which is based on a relationship between a film thickness and a transmittance. Specifically, a paste for forming a light-transmitting layer is applied onto a glass substrate (e.g., OA-10; manufactured by Nippon Electric Glass Co. Ltd.) such that the thickness after drying is 50 µm, 100 µm, 150 µm and 200 µm, and the applied paste was dried at 100° C. by hot air to obtain cured films. A calibration curve based on a relationship between a film thickness and a transmittance can be prepared by measuring the total light transmittance of light with a wavelength of 550 nm of each of the obtained cured films. When a material for forming the light-transmitting layer cannot be formed into a paste, a calibration curve can be prepared by preparing formed films having thicknesses of 100 µm, 200 µm and 300 µm with a forming machine, and measuring the total light transmittance of light with a wavelength of 550 nm of each of the prepared formed films. In addition, the thickness of a film can be measured by a contact or non-contact thickness meter.

The light-transmitting layer is preferably formed on a side opposite to a direction of irradiation of X-rays in the scintillator layer. That is, it is preferred that when X-ray irradiation is performed from a substrate side, the high concentration layer is disposed on a side closest to the substrate and the light-transmitting layer is disposed on a side farthest from the substrate. When doing so, the high concentration layer which X-rays enter first and foremost can attain a large amount of emitted light because of the high concentration of a phosphor, and the light-transmitting layer on a side close to the output substrate can suppress absorption and scattering of the emitted light because of high transmittance of light. Thereby, the emitted light can be made to reach the photoelectric conversion layer on the output substrate with high efficiency.

It is also preferred to shape a top surface of the light-transmitting layer in a cross-section of the scintillator layer into a recess in order to make emitted light of a phosphor reach a photoelectric conversion layer with efficiency.

Example of the light-transmitting layer includes a transparent resin layer in which the concentration of the phosphor is low, and a transparent resin layer not containing the phosphor. Such a layer can be formed by using a phosphor paste in which a ratio of the organic binder is increased.

Further, resin fine particles may be added to the phosphor paste. By adding the resin fine particles, cracks of the formed light-transmitting layer can be suppressed. Examples of a material of the resin fine particles include acrylic resins such as polymethyl methacrylate, polycarbonates, polystyrene, polyethers, polyesters, polyamides, phenol resins, styrene copolymers (AS resin), styrene copolymers (MS resin), polyurethanes, epoxy resins and silicon resins. Acrylic resins and epoxy resins are preferred, which are excellent in optical characteristics and mechanical strength. An average particle diameter (D50) of the resin fine particles is preferably 1 to 30 µm, and more preferably 3 to 20 µm. When the average particle diameter (D50) is less than 1 µm, handling of the photosensitive paste and adjustment of a thickness of the light-transmitting layer may become difficult. On the other hand, when the average particle diameter (D50) is more than 30 µm, this creates a strong tendency for the emitted light of a phosphor to scatter due to unevenness of the surface of the light-transmitting layer. Herein, the average particle diameter (D50) is a volume-average diameter measured by a laser diffraction/scattering type particle size distribution analyzer (e.g., MT3000 series manufactured by Microtrac Inc.).

Further, it is also preferred to use a transparent phosphor such as NaI:Tl or CsI:Tl as the light-transmitting layer. The reason for this is that the transparent phosphor not only makes light emitted from a phosphor close to the substrate reach a photoelectric conversion layer with efficiency, but also is excited by X-rays and generates light emission by itself.

A porosity of the light-transmitting layer is preferably 20% or less, and more preferably 10% or less. The porosity of the light-transmitting layer can be measured by precisely polishing a cross section of the light-transmitting layer, and then observing the cross section with an electron microscope. More specifically, the porosity can be determined by converting a part of the pores and another part derived from the resin component and the inorganic powder into images in a two-gray scale, and measuring a ratio of the area of the pores part to the area of the light-transmitting layer cross section. When the porosity of the light-transmitting layer is more than 20%, emitted light is scattered at the pores and emitted light which reaches the photoelectric conversion layer on the output substrate becomes less.

In order to use, with high efficiency, X-rays proceeding through the barrier rib for light emission of the phosphor, it is preferred that the layer in which the concentration of the phosphor is high is also formed at a portion in contact with a side surface of the barrier rib. A thickness in a direction perpendicular to a side surface of the barrier rib of such a layer, is preferably 5 µm or more, and more preferably 10 µm or more. When a thickness of the layer in which the concentration of the phosphor is high is larger, X-rays proceeding through the barrier rib can be used with high efficiency while light emission generated in the cell tends to be absorbed or scattered. Therefore, the thickness of the layer in which the concentration of the phosphor is high is preferably 20% or less of a pitch P which is a distance between neighboring walls of the barrier rib in the grid-like barrier rib.

Examples of a material of the substrate to be used for the scintillator panel include glass, ceramics, semiconductors, polymer compounds, and metals which are pervious to X-rays. Examples of the glass include quartz, borosilicate glass and chemically reinforced glass. Examples of the ceramics include sapphire, silicon nitride, and silicon carbide. Examples of the semiconductors include silicon, germanium, gallium arsenide, gallium phosphide or gallium nitrogen. Examples of the polymer compounds include cellulose acetate, polyesters, polyethylene terephthalate, polyamides, polyimides, triacetate, polycarbonates and carbon fiber reinforced resins. Examples of the metals include aluminum, iron, copper and a metal oxide. Among these materials, glass which is excellent in flatness and heat resistance is preferred. In addition, since weight reduction of the scintillator panel is promoted for convenience of transportation of the scintillator panel, the glass plate has a thickness of preferably 2.0 mm or less, and more preferably 1.0 mm or less.

The height h of the barrier rib in the scintillator panel is preferably 100 to 3000 µm. When the h of the barrier rib is more than 3000 µm, formation of the barrier rib is difficult. On the other hand, when the h of the barrier rib is less than 100 µm, the amount of a phosphor capable of filling cells decreases, and therefore the amount of emitted light of a scintillator panel is reduced. The height h of the barrier rib is more preferably 160 µm or more, and moreover preferably 250 µm or more. The height h of the barrier rib is more preferably 1000 µm or less, and moreover preferably 500 µm or less.

A shape of the barrier rib is preferably grid-like as shown in FIG. 2. Examples of a shape of an opening of the cell divided in the form of a grid include a square, a rectangle, a parallelogram, a trapezoid, a polygon and a circle. The shape of the opening of the cell is preferably a square since an aperture ratio is higher, an amount of light emission is more uniform, and the square allows easy alignment with a sensor.

In the grid-like barrier rib, the pitch P which is a distance between neighboring walls of the barrier rib is preferably 50 to 1000 µm. When the P is less than 50 µm, formation of the barrier rib is difficult. On the other hand, when the P is more than 1000 µm, image clarity is deteriorated.

The bottom width Wb of a wall of the barrier rib is preferably 20 to 150 µm. When the Wb is less than 20 µm, defects or the like easily occur in the barrier rib. On the other hand, when the Wb is more than 150 µm, the amount of a phosphor capable of filling cells decreases. The top width Wt of the wall of the barrier rib is preferably 80 µm or less. When the Wt is more than 80 µm, proceeding of the emitted light of the scintillator layer tends to be inhibited. The Wb refers to a width of a wall of the barrier rib at a location where the barrier rib is in contact with a substrate or a buffer layer in a cross-section at the time when, as shown in FIG. 3, a barrier rib is cut in its height direction and in a direction perpendicular to its longitudinal direction. Further, the Wt refers to a width of a wall of the barrier rib at a location whose h is 80% of the height of the barrier rib in the same cross-section. The h, Wb and Wt can be determined by measuring three or more locations of the barrier rib cross-section through SEM observation and calculating average values for these dimensions. In addition, a cross-section shape of the barrier rib is preferably a tapered shape, as shown in FIG. 3, in which a width of a wall of the barrier rib decreases from the bottom toward the top in order to make emitted light of a phosphor reach a photoelectric conversion layer with efficiency.

Examples of a material of the barrier rib include resins such as an acrylic resin, a polyester resin and an epoxy resin; glass, and metal, and the barrier rib is preferably predominantly composed of glass from the viewpoint of productivity and mechanical strength. Herein, the phrase "predominantly composed of glass" means that a ratio of glass to the barrier rib is 60% by mass or more. The ratio is more preferably 70% by mass or more.

Examples of a method of forming the barrier rib include an etching method, a screen printing method, a sandblasting method, a die or resin mold transfer method and a photosensitive paste method. The photosensitive paste method is preferred in order to obtain a high-resolution barrier rib.

The photosensitive paste method refers to a method of forming a barrier rib including a step of forming a photosensitive paste coating film by applying onto a substrate a photosensitive paste which contains a photosensitive organic component; an exposure step of exposing the obtained photosensitive paste coating film to light through a photomask having a desired opening; a development step of dissolving and removing a part of the exposed photosensitive paste coating film, which is soluble in a developer.

Further, in the above-mentioned method, the photosensitive paste may include a low-melting-point glass powder, and the method may include a firing step of heating the photosensitive paste pattern after the development step to a high temperature to remove the organic component and soften and sinter the low-melting-point glass and thereby forming a barrier rib.

A heating temperature in the firing step is preferably 500 to 700° C., and more preferably 500 to 650° C. By setting the heating temperature to 500° C. or higher, the organic component is completely decomposed and distilled away, and the low-melting-point glass powder is softened and sintered. On the other hand, when the heating temperature is higher than 700° C., deformation of the glass substrate or the like increases.

The photosensitive paste preferably contains an organic component containing a photosensitive organic component, and an inorganic powder containing a low-melting-point glass powder. The ratio of the inorganic powder to the photosensitive paste is preferably 30 to 80% by mass, and more preferably 40 to 70% by mass. When the ratio of the inorganic powder is less than 30% by mass, since the organic component increases, the shrinkage rate in the firing step becomes large, and therefore defects of the barrier rib easily occurs. On the other hand, when the content of the inorganic powder is more than 80% by mass, not only the stability and coatability of the photosensitive paste is adversely affected, but also the dispersibility of the inorganic powder is deteriorated to easily cause defects of the barrier rib. The ratio of the low-melting-point glass powder to the inorganic powder is preferably 50 to 100% by mass. When the ratio of the low-melting-point glass powder is less than 50% by mass, sintering of the inorganic powder is insufficient, and therefore the strength of the barrier rib is deteriorated.

A softening temperature of the low-melting-point glass powder is preferably 480° C. or higher. When the softening temperature is lower than 480° C., the organic component remains in the glass without being decomposed and distilled off to cause coloring and the like. In consideration of the heating temperature in the firing step, the softening temperature of the low-melting-point glass is preferably 480 to 700° C., more preferably 480 to 640° C., and moreover preferably 480 to 620° C.

The softening temperature of the low-melting-point glass can be determined by extrapolating a heat absorption completion temperature at an endothermic peak by a tangent method from a DTA curve obtained by measuring a sample using a differential thermal analyzer (e.g., Differential Type Differential Thermal Balance TG8120; manufactured by Rigaku Corporation). Specifically, a low-melting-point glass powder as a measurement sample is measured by elevating the temperature at 20° C./minute from room temperature with an alumina powder as a standard sample using a differential thermal analyzer, thereby obtaining a DTA curve. A softening point Ts determined by extrapolating a heat absorption completion temperature at an endothermic peak by a tangent method from the obtained DTA curve can be defined as a softening temperature of the low-melting-point glass.

The thermal expansion coefficient of the low-melting-point glass is preferably $40 \times 10^{-7}$ to $90 \times 10^{-7}$ (/K), and more preferably $40 \times 10^{-7}$ to $65 \times 10^{-7}$ (/K). When the thermal expansion coefficient is more than $90 \times 10^{-7}$ (/K), the scintillator panel to be obtained is significantly warped, and image clarity is deteriorated due to crosstalk of the emitted light or the like. On the other hand, when the thermal expansion coefficient is less than $40 \times 10^{-7}$ (/K), the softening temperature of the low-melting-point glass does not become sufficiently low.

Examples of a component to be contained for lowering the melting point of glass include lead oxide, bismuth oxide, zinc oxide and alkali metal oxides. It is preferred to adjust the softening temperature of the low-melting-point glass by the content of an alkali metal oxide selected from the group consisting of lithium oxide, sodium oxide and potassium oxide.

A ratio of an alkali metal oxide to the low-melting-point glass is preferably set to 2 to 20% by mass. When the ratio of the alkali metal oxide is less than 2% by mass, the softening temperature of the low-melting-point glass becomes high, and therefore it is necessary to perform heating at a high temperature in the firing step, and consequently it is likely that the substrate is distorted or defects occur in the barrier rib. On the other hand, when the ratio of the alkali metal oxide is more than 20% by mass, since the viscosity of the low-melting-point glass excessively decreases in the firing step, the shape of the barrier rib obtained is easily distorted. Further, the porosity of the barrier rib obtained becomes excessively low, leading to a reduction of an amount of emitted light of the scintillator panel obtained.

The low-melting-point glass preferably contains 3 to 10% by mass of zinc oxide besides the alkali metal oxide for adjusting the viscosity of the low-melting-point glass at a high temperature. When the ratio of zinc oxide is less than 3% by mass, the viscosity of the low-melting-point glass at a high temperature becomes excessively high. On the other hand, when the ratio of zinc oxide is more than 10% by mass, the cost of the low-melting-point glass increases.

Furthermore, in order to control the stability, crystallinity, transparency, refractive index, thermal expansion characteristic and the like of the low-melting-point glass, the low-melting-point glass is preferred to contain silicon oxide, boron oxide, aluminum oxide, and oxides of an alkaline earth metal selected from the group consisting of magnesium, calcium, barium and strontium and the like in addition to the alkali metal oxide and zinc oxide. An example of the preferred composition of the low-melting-point glass is shown below.

Alkali metal oxide: 2 to 20% by mass
Zinc oxide: 3 to 10% by mass
Silicon oxide: 20 to 40% by mass
Boron oxide: 25 to 40% by mass
Aluminum oxide: 10 to 30% by mass
Alkaline earth metal oxide: 5 to 15% by mass The particle diameter of the inorganic powder including a low-melting-point glass powder can be measured by using a particle size distribution measuring device (for example, MT 3300; manufactured by NIKKISO CO., LTD.) after charging the inorganic powder into a sample chamber filled with water, and subjecting the powder to an ultrasonic treatment for 300 seconds.

It is preferred that the 50% volume average particle diameter (hereinafter, referred to as "D50") of the low-melting-point glass powder is 1.0 to 4.0 μm. When the D50 is less than 1.0 μm, particles are agglomerated, resulting in deterioration of the dispersibility of particles, and this adversely affects coatability of a paste. On the other hand, when the D50 is more than 4.0 μm, the surface unevenness of a barrier rib obtained increases to tend to cause defects of the barrier rib.

The photosensitive paste may contain, as a filler, a high-melting-point glass having a softening temperature higher than 700° C., or ceramic particles such as those of silicon oxide, aluminum oxide, titanium oxide or zirconium oxide for controlling the shrinkage rate in the firing step and retaining the shape of the barrier rib. However, the ratio of the filler to the inorganic powder is preferably less than 50% by mass to avoid inhibition of sintering of the low-melting-point glass powder. Further, the D50 of the filler is preferably 0.5 to 4.0 μm for the same reason as that described for the low-melting-point glass powder.

The average refractive index n1 of the low-melting-point glass powder and the average refractive index n2 of the organic component, respectively contained in the photosensitive paste, satisfy a relationship of preferably $-0.1 \leq n1-n2 \leq 0.1$, more preferably $-0.01 \leq n1-n2 \leq 0.01$, and moreover preferably $-0.005 \leq n1-n2 \leq 0.005$. By satisfying these conditions, light scattering at the interface between the low-melting-point glass powder and the organic component is suppressed in the exposure step, so that a higher-resolution pattern can be formed.

The average refractive index n1 of the low-melting-point glass powder can be measured by using a Becke line detection method. More specifically, measurement of a refractive index of the low-melting-point glass powder at 25° C. and at a wavelength of 436 nm (g-ray) was repeated five times, and an average value of the five measurements can be defined as the n1. Further, the average refractive index n2 of the organic component can be measured by ellipsometry using a coating film of an organic component. More specifically, a coating film composed of only an organic component is formed, and measurement of a refractive index of the coating film at 25° C. and at a wavelength of 436 nm (g-ray) was repeated five times, and an average value of the five measurements can be defined as the n2.

Examples of the photosensitive organic component contained in the photosensitive paste include a photosensitive monomer, a photosensitive oligomer, a photosensitive polymer, and a photo-polymerization initiator. Here, the photosensitive monomer, the photosensitive oligomer and the photosensitive polymer refer to a monomer, an oligomer and a polymer, respectively, which have an active carbon-carbon double bond, and undergo a reaction of photo-crosslinking, photopolymerization or the like to change the chemical structure by irradiation of active light rays.

Examples of the photosensitive monomer include compounds having a vinyl group, an acryloyl group, a methacryloyl group or an acrylamide group. Polyfunctional acrylate compounds and polyfunctional methacrylate compounds are preferred. A ratio of the polyfunctional acrylate compound and the polyfunctional methacrylate compound to the organic component is preferably 10 to 80% by mass in order to increase crosslinking density.

Examples of the photosensitive oligomer and the photosensitive polymer include copolymers having a carboxyl group which is obtained by copolymerizing a carboxyl group-containing monomer such as acrylic acid, methacrylic acid, itaconic acid, crotonic acid, maleic acid, fumaric acid, vinylacetic acid or an acid anhydride thereof, and a monomer such as a methacrylic acid ester, an acrylic acid ester, styrene, acrylonitrile, vinyl acetate or 2-hydroxy acrylate. Examples of a method for introducing an active carbon-carbon double bond into an oligomer or a polymer include a method in which an ethylenically unsaturated compound having a glycidyl group or an isocyanate group, acrylic acid chloride, methacrylic acid chloride or allyl chloride, or a carboxylic acid such as maleic acid is reacted with a mercapto group, an amino group, a hydroxyl group or a carboxyl group in an oligomer or a polymer.

In addition, by using a monomer or oligomer having a urethane structure, stress relaxation occurs after the start of heating in the firing step, and therefore a photosensitive paste insusceptible to pattern defects can be obtained.

The photo-polymerization initiator refers to a compound which generates radicals when irradiated with active light rays. Examples of the photo-polymerization initiator include benzophenone, methyl(o-benzoyl)benzoate, 4,4-bis(dimethylamino)benzophenone, 4,4-bis(diethylamino)benzophenone, 4,4-dichlorobenzophenone, 4-benzoyl-4-methyl phenyl ketone, dibenzyl ketone, fluorenone, 2,2-dimethoxy-2-phenyl acetophenone, 2-hydroxy-2-methyl propiophenone, thioxanthone, 2-methylthioxanthone, 2-chlorothioxanthone, 2-isopropylthioxanthone, diethylthioxanthone, benzil, benzyl methoxy ethyl acetal, benzoin, benzoin methyl ether, benzoin isobutyl ether, anthraquinone, 2-t-butyl anthraquinone, anthrone, benzanthrone, dibenzosuberone, methylene anthrone, 4-azidobenzal acetophenone, 2,6-bis(p-azidobenzylidene)cyclohexane, 2,6-bis(p-azidobenzylidene)-4-methylcyclohexanone, 1-phenyl-1,2-butadione-2-(o-methoxycarbonyl)oxime, 1-phenyl-1,2-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, Michler's ketone, 2-methyl-1-[4-(methylthio)phenyl]-2-morpholino-1-propanone, 2-benzyl-2-dimethylamino-1-(4-morpholinophenyl)butanone-1, naphthalenesulfonyl chloride, quinolinesulfonyl chloride, N-phenylthioacridone, benzothiazole disulfide, triphenylphosphine, benzoin peroxide, and combinations of a photo-reducing dye such as eosin or methylene blue and a reducing agent such as ascorbic acid or triethanol amine.

The photosensitive paste is improved in solubility in an alkali aqueous solution when it contains a copolymer having a carboxyl group. The acid value of the copolymer having a carboxyl group is preferably 50 to 150 mg KOH/g. When the acid value is 150 mg KOH/g or less, the allowable range of development can be widened. On the other hand, when the acid value is 50 mg KOH/g or more, the solubility of an unexposed part in a developer is not reduced, and therefore a high-resolution pattern can be obtained with use of a low concentration of a developer. It is preferred that the copolymer having a carboxyl group has an ethylenically unsaturated group on a side chain. Examples of the ethylenically unsaturated group include an acrylic group, a methacrylic group, a vinyl group and an allyl group.

Examples of a method for producing the photosensitive paste include a method in which an organic solvent or the like is added to the low-melting-point glass powder and an organic component as required, and the resulting mixture is homogeneously mixed and dispersed using a three-roll roller or a kneader.

The viscosity of the photosensitive paste can be appropriately adjusted by addition of, for example, an inorganic powder, a thickener, an organic solvent, a polymerization inhibitor, a plasticizer or a precipitation preventive agent. The viscosity of the photosensitive paste is preferably 2 to 200 Pa·s. When the photosensitive paste is applied by a spin coating method, the viscosity of the photosensitive paste is more preferably 2 to 5 Pa·s, and when the photosensitive paste is applied one time by a screen printing method to obtain a coating film having a thickness of 10 to 40 μm, the viscosity is more preferably 50 to 200 Pa·s.

An example of a production method of a barrier rib using a photosensitive paste will be described below.

The photosensitive paste is applied onto the whole or a partial surface of the substrate to form a photosensitive paste coating film. Examples of an application method include a screen printing method, or a method of using a bar coater, a roll coater, a die coater or a blade coater. The thickness of the photosensitive paste coating film can be appropriately adjusted, for example, by the number of applications, a mesh of the screen, or the viscosity of the photosensitive paste.

Next, the resulting photosensitive paste coating film is exposed to light. Exposure is performed generally by a method of exposing through a photomask having an opening patterned in a desired shape; however, a method of directly making a drawing of a pattern shape by laser light and performing exposure may be employed. Examples of exposing light include a near infrared ray, a visible light ray and an ultraviolet ray, and the ultraviolet ray is preferred. Examples of a light source of the ultraviolet ray include a low-pressure mercury lamp, a high-pressure mercury lamp, an ultra-high pressure mercury lamp, a halogen lamp and a germicidal lamp, and the ultra-high pressure mercury lamp is preferred. Examples of exposure conditions include exposure performed for 0.01 to 30 minutes using an ultra-high pressure mercury lamp with a power of 1 to 100 mW/cm$^2$.

Next, a development step is performed. In the development step, using a difference in solubility in a developer between an exposed part and an unexposed part in the photosensitive paste coating film after exposure, a soluble part is dissolved and removed, and subsequently the coating film is washed with water (rinsed) and dried as required, whereby a coating film having a desired pattern shape is obtained. Examples of a method of development include a dipping method, a spray method, a brush method and an ultrasonic wave method, and when the h is more than 300 μm, the spray method and the ultrasonic wave method are preferred.

The ultrasonic wave method refers to a method of dissolving and removing the unexposed part of the coating film by irradiating the coating film with an ultrasonic wave. Since the developer erodes not only the unexposed part but also a semicured part in which exposure is insufficient to allow a dissolving reaction to proceed, a higher-resolution barrier rib pattern can be formed. In addition, the ultrasonic wave method may be used for washing with water (rinsing) after development A frequency (intensity) of an ultrasonic wave in the ultrasonic wave method is preferably 20 to 50 kHz in order to make degrees of erosion of the unexposed part and the exposed part by a developer appropriate. A power density of an ultrasonic wave per unit area of the substrate is preferably 40 to 100 W/cm$^2$. An irradiation time of an ultrasonic wave is preferably 20 to 600 seconds, more preferably 30 to 500 seconds, and moreover preferably 60 to 300 seconds.

As the developer, a solvent capable of dissolving an unnecessary part in a coating film after exposure may be appropriately selected, and an aqueous solution predominantly composed of water is preferred. When the photosensitive paste contains a compound having an acidic group, such as a copolymer having a carboxyl group, an alkali aqueous solution can be used as a developer. Examples of the alkali aqueous solution include inorganic alkali aqueous solutions such as those of sodium hydroxide, sodium carbonate and calcium hydroxide; and organic alkali aqueous solutions such as those of tetramethylammonium hydroxide, trimethylbenzylammonium hydroxide, monoethanolamine and diethanolamine. The organic alkali aqueous solution is preferred because an alkali component is easily decomposed and distilled away in a firing step. The concentration of the organic alkali aqueous solution is preferably 0.05 to 5% by mass, and more preferably 0.1 to 1% by mass in order to make degrees of dissolution of the unexposed part and the exposed part appropriate. When the alkali concentration is less than 0.05% by mass, the unnecessary part in a coating film after exposure may not be adequately removed. On the other hand, when the alkali concentration is more than 5% by mass, the coating film may be peeled or corroded by the development step. The development temperature is preferably 20 to 50° C. from the viewpoint of process control.

The resulting coating film having a desired pattern shape may be used as a barrier rib in a scintillator panel; however, the coating film having a desired pattern shape is preferably further subjected to a firing step. In the firing step, the coating film having a desired pattern shape is fired in a firing furnace in air or in an atmosphere of nitrogen, hydrogen or the like. Examples of the firing furnace include a batch-type firing furnace and a belt-type continuous firing furnace. A firing temperature is preferably 500 to 1000° C., more preferably 500 to 800° C., and moreover preferably 500 to 700° C. When the firing temperature is lower than 500° C., decomposition/removal of the organic component is inadequate. On the other hand, when the firing temperature is higher than 1000° C., a base material capable of being used is limited to a highly heat-resistant ceramic plate or the like. A firing time is preferably 10 to 60 minutes.

An inorganic powder containing the low-melting-point glass, which is contained in the barrier rib is softened and sintered to be fused together in the firing step, but pores exists between the fused inorganic powder particles. The abundance ratio of the pores included in the barrier rib can be adjusted by the heating temperature in the firing step. The ratio of the pores to the whole barrier rib, that is, porosity is preferably 2 to 25%, more preferably 5 to 25%, and moreover preferably 5 to 20% in order to achieve effective reflection of emitted light of the a phosphor and strength of a barrier rib simultaneously. When the porosity is less than 2%, the reflectivity of the barrier rib is low, and therefore the amount of emitted light of a scintillator panel decreases. On the other hand, when the porosity is more than 25%, the barrier rib has insufficient strength.

The porosity of the barrier rib can be measured by precisely polishing a cross section of a barrier rib, and then observing the cross section with an electron microscope. More specifically, the porosity can be determined by converting a part of the pores and another part derived from the inorganic powder into images in a two-gray scale, and calculating a ratio of the area of the pore part to the area of the barrier rib cross section.

A buffer layer is preferably formed between the barrier rib and the substrate in order to relax stress after the start of heating in the firing step. As a material of the buffer layer, the aforementioned low-melting-point glass can be exemplified. Further, for enhancing the light reflectivity of the buffer layer, it is preferred that the buffer layer further includes, as a filler component, particles of a high-melting-point glass which is not melted in the step of firing a barrier rib, or ceramics such as silicon oxide, aluminum oxide, titanium oxide or zirconium oxide. The high-melting-point glass refers to a glass having a softening temperature higher than 700° C. Examples of the ceramics include titanium oxide, aluminum oxide, and zirconium oxide. In addition, in order to avoid the emitted light of a phosphor from transmitting through the buffer layer, the reflectivity of the buffer layer to a light beam having a wavelength of 550 nm is preferably 60% or more. Or, a transparent buffer layer may be used and a highly reflective film may be bonded to the substrate 4. In this case, as a material of the buffer layer, the above-mentioned low-melting-point glass is used, and the buffer layer preferably does not contain the filler component. As the highly reflective film, a film having a reflectivity of 90% or more is preferred, and ESR manufactured by 3M Company and E6SQ manufactured by TORAY INDUSTRIES, INC. are preferably used.

The buffer layer, can be formed by applying a paste formed by dispersing an organic component and an inorganic powder such as a high-melting-point glass powder, a ceramic powder or a low-melting-point glass powder in a solvent to a substrate, drying the paste to form a coating film, and firing the coating film. A firing temperature is preferably 500 to 700° C., and more preferably 500 to 650° C.

Next, a composition containing a phosphor, that is, a phosphor paste is charged into cells divided by the barrier rib to form a scintillator layer, whereby a scintillator panel can be completed. Here, the cell refers to a space divided by a barrier rib.

Examples of a method for forming a scintillator layer in the cell include a method in which crystalline CsI (hereinafter, referred to as "CsI") is deposited by vacuum deposition; a method in which CsI and a thallium compound such as thallium bromide are co-deposited by vacuum deposition; a method in which a slurry of a phosphor dispersed in water is charged; and a method in which a phosphor paste prepared by mixing a phosphor powder, an organic binder, and an organic solvent is charged using screen printing or a dispenser. The method of charging a phosphor paste by screen printing or a dispenser is preferred from the viewpoint of forming a plurality of layers having different phosphor concentrations.

In order to form a layer in which the concentration of the phosphor is high in the vicinity of a side surface of the barrier rib, a drying condition of the charged phosphor paste is important. Examples of a preferred drying condition include hot-air drying and IR drying while a substrate is shaking.

Examples of the phosphor include CsI, $Gd_2O_2S$, $Y_2O_2S$, ZnS, $Lu_2O_2S$, $LaCl_3$, $LaBr_3$, $LaI_3$, $CeBr_3$, $CeI_3$ and $LuSiO_5$, and CsI and $Gd_2O_2S$ are preferred which are high in the conversion rate of an X ray to visible light.

For enhancing the amount of emitted light, an activator may be added to the phosphor. Examples of the activator include indium (In), thallium (Tl), manganese (Mn), lithium (Li), potassium (K), rubidium (Rb), sodium (Na), and thallium compounds such as thallium bromide (TlBr), thallium chloride (TlCl) and thallium fluoride (TlF and $TlF_3$) as well as lanthanoids such as lanthanum (La), cerium (Ce), praseodymium (Pr), europium (Eu) and terbium (Tb).

The phosphor paste may contain an organic binder. Examples of the organic binder include polyvinyl butyral, polyvinyl acetate, polyvinyl alcohol, polyethylene, silicon resins such as polymethylsiloxane and polymethylphenylsiloxane, polystyrene, a butadiene-styrene copolymer, polystyrene, polyvinylpyrrolidone, polyamide, high molecular weight polyether, an ethylene oxide-propylene oxide copolymer, polyacrylamide and an acrylic resin.

The phosphor paste may contain an organic solvent. When the phosphor paste contains an organic binder, it is preferred that the organic solvent is a good solvent of the organic binder and its hydrogen bonding strength is large. Examples of such an organic solvent include diethylene glycol monobutyl ether acetate, ethylene glycol monobutyl ether alcohol, diethylene glycol monobutyl ether, methyl ethyl ketone, cyclohexanone, isobutyl alcohol, isopropyl alcohol, terpineol, benzyl alcohol, tetrahydrofuran, dimethyl sulfoxide, dihydroterpineol, γ-butyrolactone, dihydroterpinyl acetate, hexylene glycol and bromobenzoic acid.

EXAMPLES

The present invention will be described in more detail below by way of Examples and Comparative Examples; however, the present invention is not limited thereto.

(Preparation of Photosensitive Paste)

Twenty four parts by mass of the photosensitive polymer, 4 parts by mass of the photosensitive monomer x, 4 parts by mass of the photosensitive monomer y, 6 parts by mass of the photo-polymerization initiator, 0.2 parts by mass of the polymerization inhibitor and 12.8 parts by mass of the ultraviolet ray absorber solution were dissolved in 38 parts by mass of an organic solvent under heating at a temperature of 80° C. to obtain an organic solution 1.

Specific materials are as follows.

Photosensitive polymer: product of an addition reaction of 0.4 equivalents of glycidyl methacrylate to carboxyl groups of a copolymer composed of methacrylic acid/methyl methacrylate/styrene in a mass ratio of 40:40:30 (weight average molecular weight: 43000, acid value: 100)

Photosensitive monomer x: trimethylolpropane triacrylate

Photosensitive monomer y: tetrapropylene glycol dimethacrylate

Photo-polymerization initiator: 2-benzyl-2-dimethylamino-1-(4-morpholinophenyl)butanone-1 (IC369 manufactured by BASF Japan Ltd.)

Polymerization inhibitor: 1,6-hexanediol-bis[(3,5-di-t-butyl-4-hydroxyphenyl)propionate])

Ultraviolet ray absorber solution: 0.3 mass % γ-butyrolactone solution (Sudan IV; manufactured by TOKYO OHKA KOGYO Co., Ltd.)

Organic solvent: γ-butyrolactone

To 60 parts by mass of the organic solution 1 were added 30 parts by mass of a low-melting-point glass powder and 10 parts by mass of a high-melting-point glass powder, followed by kneading the resulting mixture by a three-roll kneader to prepare a photosensitive paste. Specific composition and the like of the glass powder are as follows.

Low-melting-point glass powder: 27% by mass of $SiO_2$, 31% by mass of $B_2O_3$, 6% by mass of ZnO, 7% by mass of $Li_2O$, 2% by mass of MgO, 2% by mass of CaO, 2% by mass of BaO, 23% by mass of $Al_2O_3$; softening temperature: 588° C.; thermal expansion coefficient: $68\times10^{-7}$ (/K), average particle diameter (D50): 2.3 µm High-melting-point glass powder: 30% by mass of $SiO_2$, 31% by mass of $B_2O_3$, 6% by mass of ZnO, 2% by mass of MgO, 2% by mass of CaO, 2% by mass of BaO, 27% by mass of $Al_2O_3$; softening temperature: 790° C.; thermal expansion coefficient: $32\times10^{-7}$ (/K); average particle diameter (D50): 2.3 µm.

(Preparation of Buffer Layer Paste)

To 97 parts by mass of the photosensitive paste was added 3 parts by mass of the titanium oxide powder (average particle diameter (D50) 0.1 µm), and the resulting mixture was kneaded to prepare a buffer layer paste.

(Preparation of Phosphor Paste A)

Thirty parts by mass of an organic binder (ethyl cellulose (7 cp)) was dissolved in 70 parts by mass of an organic solvent (benzyl alcohol) under heating at a temperature of 80° C. to obtain an organic solution 2. Further, as a phosphor powder, gadolinium oxysulfide ($Gd_2O_2S$) having an average particle diameter (D50) of 10 µm was prepared. Seventy parts by mass of a phosphor powder was mixed in 15 parts by mass of the organic solution 2 to obtain a phosphor paste A.

(Preparation of Phosphor Paste B)

Fifty parts by mass of a phosphor powder was mixed in 15 parts by mass of the organic solution 2 to obtain a phosphor paste B.

(Preparation of Light-Transmitting Layer Paste A)

Five parts by mass of a phosphor powder was mixed in 15 parts by mass of the organic solution 2 to obtain a light-transmitting layer paste A.

(Preparation of Light-Transmitting Layer Paste B)

Thirty parts by mass of an organic binder (acrylic resin "OLYCOX" KC-7000; manufactured by KYOEISHA CHEMICAL CO., LTD.) was dissolved in 70 parts by mass of an organic solvent (terpineol) under heating at a temperature of 80° C. to obtain an organic solution 3. Twenty parts by mass of resin particles (acrylic resin particles having an average particle diameter (D50) of 12 μm; "Techpolymer" MBX-12; manufactured by SEKISUI PLASTICS CO., Ltd.) were dispersed in the total amount of the obtained organic solution 3 to obtain a light-transmitting layer paste B.

(Preparation of Light-Transmitting Layer C Powder)

As a phosphor powder, a light-transmitting layer C powder was prepared by crystallizing CsI:Tl (0.2% by mass) by a Bridgmann method, grinding the crystal with a mortar, and filtrating a ground product with a filter with a bore size of 200 μm to level a particle size.

Example 1

The aforementioned photosensitive paste was applied onto a glass substrate (OA-10; manufactured by Nippon Electric Glass Co., Ltd.; thermal expansion coefficient $38 \times 10^{-7}$ (/K), substrate thickness: 0.7 mm) having a size of 100 mm×100 mm with a die coater so that a thickness of a dried coating film is 660 μm, and then dried in an IR drying furnace at 100° C. for 4 hours to form a photosensitive paste coating film. The resulting photosensitive paste coating film was exposed at an exposure amount of 800 mJ/cm² by an ultra-high pressure mercury lamp through a photomask having an opening corresponding to a desired barrier rib pattern (chrome mask having a grid-like opening with both longitudinal and traverse pitches of 300 μm and a line width of 20 μm). The exposed photosensitive paste coating film was developed by showering at a pressure of 1.5 kg/cm² for 420 seconds using a 0.5% by mass aqueous ethanolamine solution at 35° C. as a developer. The photosensitive paste coating film was further irradiated with ultrasonic waves of 40 kHz for 240 seconds while being impregnated with the developer, washed with water by showering at a pressure of 1.5 kg/cm², and dried at 100° C. for 10 minutes to form a grid-like photosensitive paste pattern. The resulting grid-like photosensitive paste pattern was fired at 585° C. for 15 minutes in air to obtain a grid-like barrier rib having a cross-section shape as shown in Table 1.

The aforementioned phosphor paste B was solid-printed on the formed barrier rib throughout the surface using a screen printer (manufactured by MICROTEK Inc.; a phosphor squeegee used; a screen plate #200 SUS mesh) and subjected to a vacuum treatment in a desiccator, and then the phosphor paste having overflowed the barrier rib was scraped off using a rubber squeegee. Thereafter, the phosphor paste was dried in a hot-air oven at 100° C. for 40 minutes to form a first layer having a thickness as shown in Table 1 in the scintillator layer.

Moreover, the aforementioned light-transmitting layer paste A was solid-printed on the first layer throughout the surface using a screen printer (a phosphor squeegee used; a screen plate #400 SUS mesh) and subjected to a vacuum treatment in a desiccator, and then the light-transmitting layer paste having overflowed the barrier rib was scraped off using a rubber squeegee. Thereafter, the light-transmitting layer paste was dried in a hot-air oven at 100° C. for 40 minutes to form a second layer (light-transmitting layer) having a thickness as shown in Table 1 in the scintillator layer to obtain a scintillator panel (Ex. 1).

The obtained scintillator panel (Ex. 1) was set in an FPD (PaxScan2520; manufactured by Varian Medical Systems, Inc.) to prepare a radiation detector. X rays at a tube voltage of 80 kVp were applied from the substrate side of the scintillator panel, and an amount of emitted light of the scintillator panel (Ex. 1) was detected by the FPD, and consequently, a sufficient amount of emitted light was attained (this amount of emitted light is defined as 100). Further, a solid image at this time was reproduced as an image by an image reproducing device, and the obtained print image was visually observed to evaluate presence/absence of image defects, crosstalk and linear noises; however, these defects were not observed. Thereafter, the scintillator panel (Ex. 1) was taken out from the FPD, and its cross-section was precisely polished to obtain a porosity of the light-transmitting layer. Specific evaluation results are shown in Table 1.

Example 2

A scintillator panel (Ex. 2) was prepared by the same method as in Example 1 except for changing the line width of the photomask to 10 μm and the exposure amount to 1400 mJ/cm². Using the prepared scintillator panel (Ex. 2), a radiation detector was prepared and evaluated in the same manner as in Example 1, and consequently, a sufficient amount of emitted light exceeding that of Example 1 was attained, and image defects, crosstalk and linear noises were not observed. Thereafter, a porosity of the light-transmitting layer was obtained in the same manner as in Example 1. Specific evaluation results are shown in Table 1.

Example 3

A scintillator panel (Ex. 3) was prepared by the same method as in Example 2 except for changing the thickness of the dried photosensitive paste coating film to 800 μm, the time of development by showering to 600 seconds, and the light-transmitting layer paste to the light-transmitting layer paste B. Using the prepared scintillator panel (Ex. 3), a radiation detector was prepared and evaluated in the same manner as in Example 1, and consequently, a sufficient amount of emitted light exceeding that of Example 2 was attained, and image defects, crosstalk and linear noises were not observed. Thereafter, a porosity of the light-transmitting layer was obtained in the same manner as in Example 1. Specific evaluation results are shown in Table 1.

Example 4

The same operation as in Example 1 was performed up to the first layer of the scintillator layer. In the formation of the second layer (light-transmitting layer), the light-transmitting layer C powder was charged into an opening of the phosphor and the powder was packed by applying a pressure of 100 MPa using a press machine to obtain a scintillator panel (Ex.

4). Using the prepared scintillator panel (Ex. 4), a radiation detector was prepared and evaluated in the same manner as in Example 1, and consequently, a sufficient amount of emitted light exceeding that of Example 1 was attained, and image defects, crosstalk and linear noises were not observed. Thereafter, a porosity of the light-transmitting layer was obtained in the same manner as in Example 1. Specific evaluation results are shown in Table 1.

Comparative Example 1

A scintillator panel (Comp. Ex. 1) was prepared by the same method as in Example 1 except for changing the phosphor paste of the first layer to the phosphor paste A and not forming the second layer. Using the prepared scintillator panel (Comp. Ex. 1), a radiation detector was prepared and evaluated in the same manner as in Example 1, and consequently, an amount of emitted light was smaller than that of Example 1 although image defects, crosstalk and linear noises were not observed. Specific evaluation results are shown in Table 1.

Comparative Example 2

A scintillator panel (Comp. Ex. 2) was prepared by the same method as in Comparative Example 1 except for changing the thickness of the dried photosensitive paste coating film to 800 μM. Using the prepared scintillator panel (Comp. Ex. 2), a radiation detector was prepared and evaluated in the same manner as in Example 1, and consequently, an amount of emitted light was further smaller than that of Comparative Example 1 although image defects, crosstalk and linear noises were not observed. Specific evaluation results are shown in Table 1.

DESCRIPTION OF REFERENCE SIGNS

1 Radiation detector
2 Scintillator panel
3 Output substrate
4 Substrate
5 Buffer layer
6 Barrier rib
7(a), 7(b) Scintillator layer
8 Diaphragm layer
9 Photoelectric conversion layer
10 Output layer
11 Substrate
12 Power supply portion

The invention claimed is:
1. A scintillator panel comprising:
a substrate,
a barrier rib formed on the substrate, and
a scintillator containing a phosphor, wherein the scintillator fills cells divided by the barrier rib,
wherein the scintillator is formed of a plurality of layers having a different concentration of the phosphor,
wherein the layer closest to the substrate has the highest concentration of the phosphor, and
wherein the phosphor is selected from CsI and $Gd_2O_2S$.
2. The scintillator panel according to claim 1, wherein at least one of the plurality of layers forming the scintillator is a light-transmitting layer.
3. The scintillator panel according to claim 2, wherein a porosity of the light-transmitting layer is 20% or less.
4. The scintillator panel according to claim 1, wherein the barrier rib has a grid-like configuration.

TABLE 1

| | Shape of Cross-Section of Barrier Rib | | | Thickness of Layers of Scintillator Layer | | Transmittance of Light-Transmitting Layer (%) |
|---|---|---|---|---|---|---|
| | Height h (μm) | Top Width Wt (μm) | Bottom Width Wb (μm) | First Layer (μm) | Light-Transmitting Layer (μm) | |
| Example 1 | 400 | 25 | 40 | 350 | 50 | 95 |
| Example 2 | 400 | 11 | 45 | 350 | 50 | 95 |
| Example 3 | 480 | 11 | 51 | 350 | 130 | 99 |
| Example 4 | 400 | 25 | 40 | 350 | 50 | 55 |
| Comparative Example 1 | 400 | 25 | 40 | 395 | none | — |
| Comparative Example 2 | 480 | 25 | 40 | 476 | none | — |

| | Porosity of Light-Transmitting Layer (%) | Paned Characteristics | | Amount of Emitted Light (Comparison relative to Example 1) |
|---|---|---|---|---|
| | | Linear Noise | Image Defect | |
| Example 1 | 10 | none | none | 100 |
| Example 2 | 10 | none | none | 126 |
| Example 3 | 8 | none | none | 153 |
| Example 4 | 18 | none | none | 120 |
| Comparative Example 1 | — | none | none | 91 |
| Comparative Example 2 | — | none | none | 75 |

5. The scintillator panel according to claim 1, wherein the barrier rib is predominantly composed of glass.

6. The scintillator panel according to claim 1, wherein a cross-section of the barrier rib has a tapered shape.

7. The scintillator panel according to claim 1, wherein the top width Wt of the wall of the barrier rib is 80 μm or less.

* * * * *